(12) United States Patent
Kim et al.

(10) Patent No.: US 12,737,607 B2
(45) Date of Patent: Sep. 15, 2026

(54) METHOD AND DEVICE FOR TRAINING NEURAL NETWORK

(71) Applicant: SAMSUNG ELECTRONICS CO., LTD., Suwon-si (KR)

(72) Inventors: Byeoungsu Kim, Hwaseong-si (KR); Kyoungyoung Kim, Suwon-si (KR); Jaegon Kim, Hwaseong-si (KR); Changgwun Lee, Hwaseong-si (KR); Sanghyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 982 days.

(21) Appl. No.: 17/033,088

(22) Filed: Sep. 25, 2020

(65) Prior Publication Data

US 2021/0264260 A1 Aug. 26, 2021

(30) Foreign Application Priority Data

Feb. 21, 2020 (KR) ........................ 10-2020-0021798

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 7,548,847 B2 | 6/2009 | Acero et al. | |
| 7,555,705 B2 | 6/2009 | Chen et al. | |
| 8,341,112 B2 | 12/2012 | Zhang et al. | |
| 8,793,231 B2 | 7/2014 | Cragun et al. | |
| 10,579,907 B1 * | 3/2020 | Kim | G06F 18/24143 |
| 10,964,057 B2 * | 3/2021 | Furihata | G06V 20/10 |
| 11,200,511 B1 * | 12/2021 | London | G06N 7/01 |

(Continued)

FOREIGN PATENT DOCUMENTS

| | | |
|---|---|---|
| CN | 108171329 A | 6/2018 |
| CN | 108805258 A | 11/2018 |

(Continued)

OTHER PUBLICATIONS

Shorten et al("A survey on Image Data Augmentation for Deep Learning", 2019) (Year: 2019).*

(Continued)

*Primary Examiner* — Jason B Dunham
*Assistant Examiner* — Huma Waseem
(74) *Attorney, Agent, or Firm* — Morgan, Lewis & Bockius LLP

(57) ABSTRACT

The present disclosure relates to neural network training. The neural network training relates to a training method, a training device, and a system including the neural network. The neural network training includes extracting annotation data and first reliability values for first data using a neural network trained based on training data, selecting second data from among the first data based on the second data having second reliability values greater than or equal to a threshold value, expanding the training data based on the second data, and retraining the neural network based on the expanded training data.

16 Claims, 19 Drawing Sheets

(56) References Cited

U.S. PATENT DOCUMENTS

| | | | | |
|---|---|---|---|---|
| 11,269,911 | B1 * | 3/2022 | Jones | G06F 9/543 |
| 2003/0061028 | A1 | 3/2003 | Dey et al. | |
| 2005/0027664 | A1 | 2/2005 | Johnson et al. | |
| 2011/0268360 | A1 * | 11/2011 | Antonijevic | G06V 30/153 382/177 |
| 2014/0114947 | A1 | 4/2014 | Walther et al. | |
| 2018/0260759 | A1 | 9/2018 | Bencke et al. | |
| 2018/0322865 | A1 | 11/2018 | Huang et al. | |
| 2018/0373980 | A1 * | 12/2018 | Huval | G06F 18/41 |
| 2019/0102656 | A1 | 4/2019 | Kwant et al. | |
| 2019/0138852 | A1 * | 5/2019 | Lio | G06F 18/2185 |
| 2019/0244030 | A1 * | 8/2019 | Yoshinaga | G06V 20/64 |
| 2020/0074280 | A1 * | 3/2020 | Meier | G06N 3/084 |
| 2020/0118444 | A1 * | 4/2020 | Wen | H04L 67/51 |
| 2020/0134263 | A1 * | 4/2020 | Oh | G06N 3/045 |
| 2020/0193552 | A1 * | 6/2020 | Turkelson | G06N 20/20 |
| 2020/0387756 | A1 * | 12/2020 | Takehara | G06V 20/00 |
| 2021/0035015 | A1 * | 2/2021 | Edgar | G06F 18/211 |
| 2021/0056412 | A1 * | 2/2021 | Jung | G06N 3/045 |
| 2021/0064418 | A1 * | 3/2021 | Natarajan | G06F 9/4881 |
| 2021/0142168 | A1 * | 5/2021 | Kushnir | G06N 3/084 |
| 2021/0166105 | A1 * | 6/2021 | Panjwani | G06N 3/08 |
| 2021/0166679 | A1 * | 6/2021 | Ando | G10L 25/30 |
| 2021/0224611 | A1 * | 7/2021 | Yu | G06N 20/00 |
| 2021/0295162 | A1 * | 9/2021 | Guo | G06N 3/04 |
| 2021/0326729 | A1 * | 10/2021 | Zhu | G06F 16/735 |
| 2022/0101127 | A1 * | 3/2022 | Torras | G06V 10/774 |

FOREIGN PATENT DOCUMENTS

| | | | |
|---|---|---|---|
| CN | 110084131 | A | 8/2019 |
| WO | 2020-078235 | A1 | 4/2020 |

OTHER PUBLICATIONS

Office Action dated Aug. 26, 2021 in corresponding German Patent Application No. 102020127185.9 (in German) (3 pages).

Office Action dated Aug. 26, 2021 in corresponding German Patent Application No. 102020127185.9 (in English) (8 pages).

Murthy, et al., "Automatic Image Annotation Using Deep Learning Representations", IDMR'15, Jun. 23-26, 2015, 4 pages.

Wang, et al., "The Effectiveness of Data Augmentation in Image Classification using Deep Learning", arXiv:1712.04621v1 [cs.CV] Dec. 13, 2017, p. 1*8.

Hsu, et al., "Unsupervised Learning Via Meta-Learning", arXiv:1810.02334v6 [cs.CV] Mar. 21, 2019, pp. 1-24.

Sohn, Kihyuk et al., "FixMatch: Simplifying Semi-Supervised Learning with Consistency and Confidence," arXiv:2001.07685v1 [cs.LG] Jan. 21, 2020.

Berthelot, David et al., "RemixMatch: Semi-Supervised Learning With Distribution Alignment and Augmentation Anchoring," arXiv:1911.09785v2 [cs.LG] Feb. 13, 2020.

Office Action issued Jan. 28, 2026 in corresponding Korean Patent Application No. 10-2020-0021798.

Second Office Action issued May 8, 2026 in corresponding Chinese Patent Application No. 202110190079.9.

Notice of Allowance dated Jul. 22, 2026 issued in corresponding to Korean Patent Application No. 10-2020-0021798.

* cited by examiner

FIG. 10B

| Reliability Range | Ratio |
|---|---|
| RR1 | 5% |
| RR2 | 10% |
| RR3 | 25% |
| RR4 | 60% |

Figure 14:
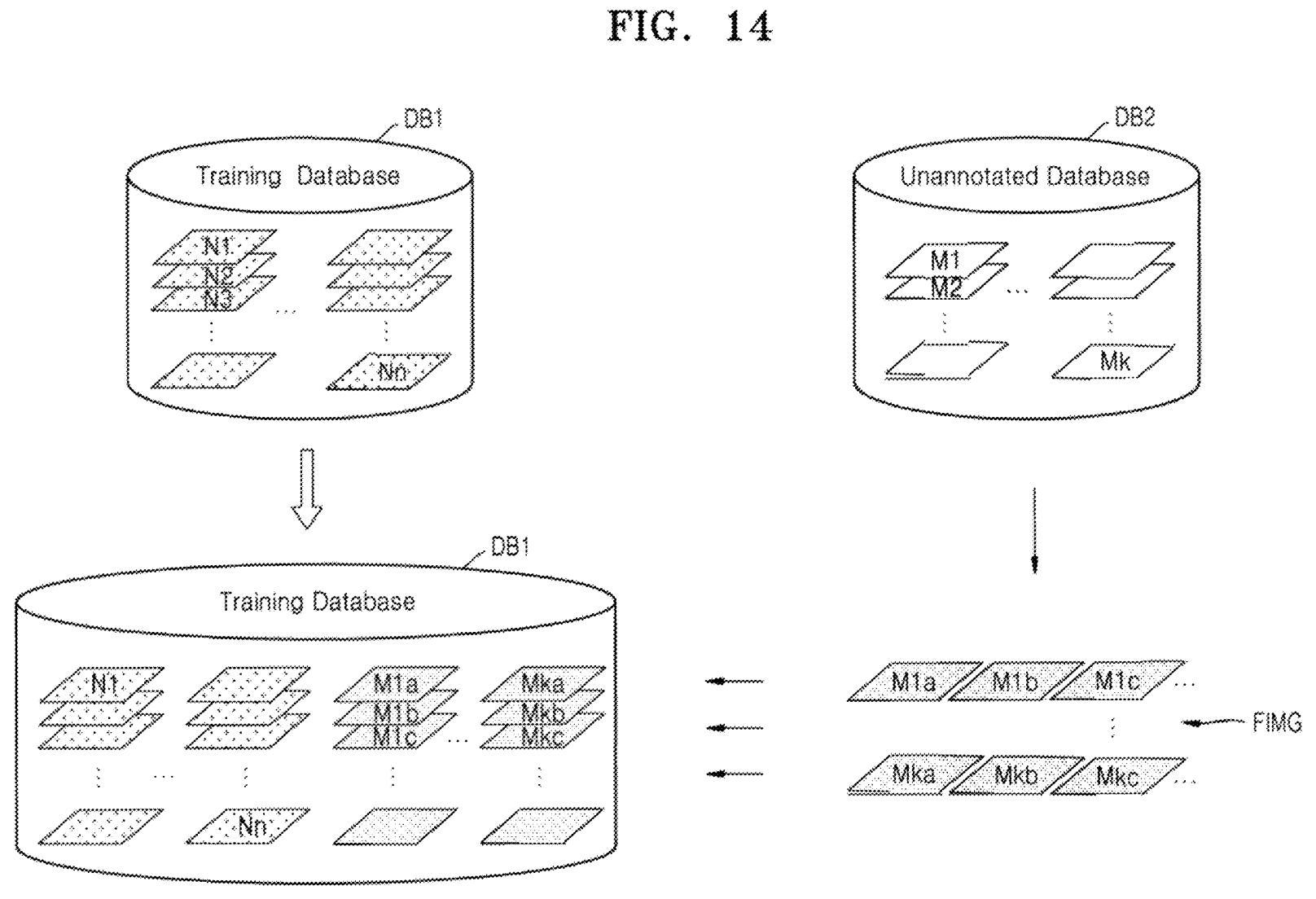

Training Database

N1
N2
N3

Nn

DB2

Unannotated Database

M1
M2

Mk

FIMG

M1a
M1b
M1c

Mka
Mkb
Mkc

DB1

Training Database

N1

Nn

M1a
M1b
M1c

Mka
Mkb
Mkc

METHOD AND DEVICE FOR TRAINING NEURAL NETWORK

CROSS-REFERENCE TO RELATED APPLICATION

This application claims the benefit of Korean Patent Application No. 10-2020-0021798, filed on Feb. 21, 2020, in the Korean Intellectual Property Office, the disclosure of which is incorporated by reference herein in its entirety.

BACKGROUND

The inventive concept relates to a neural network training method, a neural network training device, and a neural network system for performing the neural network training method.

An artificial neural network (ANN) system is a computer system used to mimic the function or an organic neural network, enabling machines to learn and make decisions. Artificial intelligence (AI) systems such as ANNs may increase pattern recognition rates and can understand user preferences more accurately through training. As a result, AI systems have been applied to various types of electronic devices and data processing systems, using neural network models.

Various types of neural network models based on machine learning or deep learning are used in AI systems. In some cases, large amounts of training data are used to train a neural network model. The training data includes raw data and annotations or labels for the raw data. The training data may include images, data sets, or the like. However, when the training data is not sufficient or robust enough, the performance of a trained neural network may be degraded. Therefore, there is a need in the art for training a neural network with various data sources.

SUMMARY

The inventive concept provides a method and device for training a neural network and a neural network system including the device, by which the performance of the neural network may be increased by processing obtained data and adding a processed result as training data.

According to an aspect of the inventive concept, there is provided a neural network training method including: extracting annotation data and first reliability values for first data using a neural network trained based on training data; selecting second data from among the first data based on the second data having second reliability values greater than or equal to a threshold value; expanding the training data based on the second data; and retraining the neural network based on the expanded training data.

According to another aspect of the inventive concept, there is provided a neural network training device including: a memory storing one or more instructions; and at least one processor configured to execute the one or more instructions stored in the memory to: extract annotation data for collected data by performing inference on the collected data with a neural network trained based on initial training data; add training data based on reference data among the collected data having a reliability that is greater than or equal to a threshold value; and retrain the neural network based on the added training data and the initial training data.

According to another aspect of the inventive concept, there is provided a neural network system including: a learning module configured to process collected data to produce annotation data, expand a training database by selectively adding processed versions of the collected data to the training database based on a reliability of the annotation data, and retrain a neural network based on the expanded training database; and a data recognition module configured to extract recognition information for input data by performing inference on the input data based on the retrained neural network.

According to another aspect of the inventive concept, there is provided a system on chip including: a learning module configured to extract annotation data for external data received from an external device by performing inference on the external data based on a neural network, expand a training database by adding, to the training database, a portion of the external data for which the corresponding annotation data has a relatability that is greater than or equal to a threshold value from among the external data, and retrain the neural network based on the expanded training database; and a data recognition module configured to perform data recognition for input data based on the retrained neural network.

According to another aspect of the inventive concept, a method of training a neural network comprises: training the neural network based on initial training data; performing inference on additional data using the trained neural network to produce annotation data; selecting a portion of the additional data based on a corresponding portion of the annotation data having a reliability above a predetermined threshold; and retraining the neural network based on the initial training data and the selected portion of the additional data along with the corresponding portion of the annotation data.

BRIEF DESCRIPTION OF THE DRAWINGS

Embodiments of the inventive concept will be more clearly understood from the following detailed description taken in conjunction with the accompanying drawings in which:

FIGS. 10A and 10B illustrate a method, performed by a neural network system, of adding data to training data based on a reliability distribution, according to an example embodiment of the inventive concept;

FIGS. 11 through 14 respectively illustrate an addition of training data according to example embodiments of the inventive concept;

DETAILED DESCRIPTION OF THE EMBODIMENTS

Figure 1:
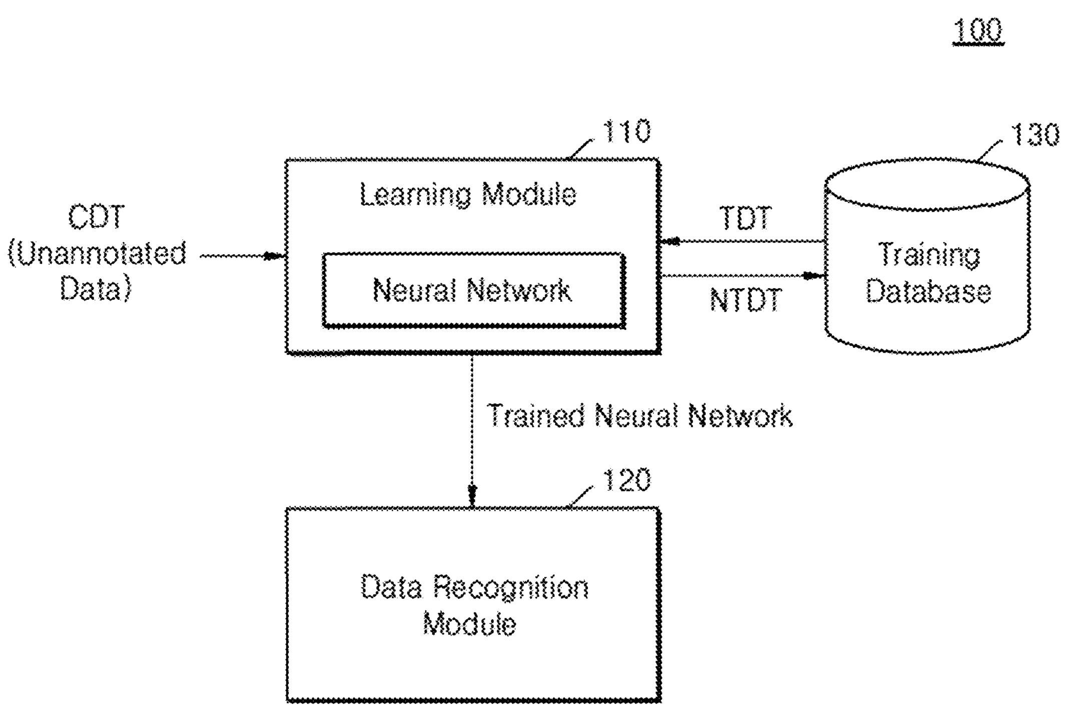
FIG. 1 is a block diagram of a configuration of an electronic system according to an example embodiment of the inventive concept.

The present disclosure relates generally to an artificial neural network (ANN). More particularly, to neural network training with various training data sources. Embodiments of the present disclosure train a neural network with both annotated and unannotated data for increased accuracy and normalization.

An ANN is a hardware or a software component that includes a number of connected nodes (i.e., artificial neurons), which loosely corresponds to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Supervised learning is one of three basic machine learning paradigms, alongside unsupervised learning and reinforcement learning. Supervised learning is a machine learning task based on learning a function that maps an input to an output based on example input-output pairs (i.e., annotated training data). Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

In some cases, a large amount of training data (annotated data) is used to train a neural network in a supervised learning context. However, when training data is insufficient, the training data may be transformed and the transformed data may be added as training data. In some cases, features are identified using a clustering technique without the addition of training data. Thus, the amount of training data for supervised learning may be increased, but accuracy or normalization may be reduced. Furthermore, when input data is unevenly distributed or the distance between features varies, a neural network may produce incorrect results.

Therefore, the present disclosure extracts annotation information from unannotated external data using a neural network trained with annotated training data. A portion of the annotated data produced by the neural network that is determined to be reliable may be added as additional training data for the neural network. The neural network is then retrained based on the expanded training data. Additionally, external data (unannotated data) is added as training data.

Hereinafter, embodiments of the inventive concept will be described in detail with reference to the accompanying drawings.

FIG. 1 is a block diagram of a configuration of an electronic system 100 according to an example embodiment of the inventive concept.

The electronic system 100 of FIG. 1 may extract valid information by analyzing input data in real-time based on a neural network and determine a situation based on the extracted valid information or control components of an electronic device in which the electronic system 100 is mounted. The electronic system 100 may be referred to as a neural network system.

Examples of a neural network may include, but are not limited to, various types of neural network models including convolution neural networks (CNNs) such as GoogLeNet, AlexNet, visual geometry group (VGG) network, etc., regions with CNNs (R-CNNs), region proposal networks (RPNs), stacking-based deep neural networks (S-DNNs), recurrent neural networks (RNNs), stacking-based DNNs (S-DNNs), state-space dynamic neural networks (S-SDNNs), deconvolution networks (DNS), deep belief networks (DBNs), restricted Boltzmann machines (RBMs), fully convolutional networks (FCNs), long short-term memory (LSTM) networks, classification networks, etc. Furthermore, the neural network may include sub-neural networks, and the sub-neural networks may be implemented as heterogeneous neural networks.

The electronic system 100 of FIG. 1 may be an application processor (AP) employed in a mobile device. Additionally or alternatively, the electronic system 100 of FIG. 1 may correspond to a computing system, a drone, an advanced driver assistance system (ADAS), a robot, a smart TV, a smartphone, a medical device, a mobile device, an image display device, a measurement device, an Internet of Things (IoT) device, or the like.

Referring to FIG. 1, the electronic system 100 may include a learning module 110 and a data recognition module 120, and may further include a training database 130.

The learning module 110 may train a neural network, i.e., a deep learning model. The learning module 110 may train the neural network to learn a criterion for extracting features of input data. For example, various parameters (e.g., bias, weights, etc.) of the neural network may be determined via training.

The learning module 110 may train the neural network based on training data TDT in the training database 130. The training data TDT includes raw data and an annotation data (i.e., the "ground truth" or correct label) for the raw data. The training data TDT may be ground truth data. A large amount of training data TDT is used to train the neural network. In some cases, when high accuracy and complex training data is used for the neural network, a larger amount of training data TDT may be used.

When the amount of training data TDT included in the training database 130 is not sufficient to train the neural network, the performance of the neural network may be degraded or over-fitting may occur. Over-fitting means a state in which a test error (e.g., an error in an inference result on input data) is abnormally high compared to a training error (e.g., an error in an inference result on training data).

According to an embodiment of the inventive concept, the learning module 110 may process collected data CDT that may be unannotated data to produce annotated data and add at least some pieces of the annotated data to the training database 130, thereby expanding the training data TDT. Additionally or alternatively, the learning module 110 may increase the amount of training data TDT through processing on the collected data CDT.

In an embodiment, the learning module 110 may extract an annotation for the collected data CDT by using a neural network trained based on the training data TDT, e.g., initial training data. The learning module 110 may perform inference on the collected data CDT based on the neural network and extract an annotation as a result of the inference. A reliability (or confidence) of the inference result also may be extracted. For example, the reliability of the annotation may be extracted together with the annotation. Hereinafter, in the present disclosure, reliability refers to the reliability of an inference result (for example, annotation). In some cases, the reliability is based on a probability that the inference result is correct. The learning module 110 may select, as reference data, data with relatively high reliability, e.g., reliability greater than or equal to a threshold value, from among collected data CDT with the extracted annotation.

According to an embodiment, the learning module 110 may add an annotation to collected data CDT obtained based on a search term entered by a user. In this case, the user refers to a person using the electronic system 100, and the collected data CDT may be obtained by the user performing a search based on a search term over a communication network such as a web or the Internet. The learning module 110 may generate an annotation for the collected data CDT based on the search term, and in this case, the reliability of the annotation may be high. Therefore, the learning module 110 may generate reference data by adding the annotation to the collected data CDT based on the search term.

The learning module 110 may transform the reference data by using various transformation techniques to generate a number of transformed versions of the reference data. In this case, the transformed versions of the reference data may include the same annotation as the reference data before the reference data is transformed. However, the reliability of the transformed versions of the reference data may be reduced compared to that of the reference data. The learning module 110 may select data with reliability greater than or equal to a reference value from among transformed versions of the reference data and add the selected data to the training database 130. Methods, performed by the learning module 110, of expanding the training data TDT will be described in more detail below with reference to FIGS. 3 through 14.

The learning module 110 may retrain the neural network based on the expanded training data TDT, and accordingly, the performance of the neural network (e.g., problem-solving accuracy or scalability) may be increased. For example, the performance of the neural network retrained based on the expanded training data TDT may be increased compared to the performance of the neural network trained based on the initial training data.

The data recognition module 120 may extract feature information of input data or obtain output data based on the extracted feature information by using the trained neural network, i.e., the neural network trained or retrained by the learning module 110. For example, to perform a task for electronic system 100, the data recognition module 120 may perform inference on an input image based on the neural network. Neural network computations during the inference may be performed by separate accelerators, such as a graphics processing unit (GPU), a neural processing unit (NPU), a digital signal processor (DSP), a field-programmable gate array (FPGA), etc.

The data recognition module 120 may generate an information signal as a result of the inference. The information signal may include one of various types of recognition signals, including a voice recognition signal, an object recognition signal, an image recognition signal, and a biometric information recognition signal. For example, the data recognition module 120 may extract feature information from the input image or obtain, based on the extracted feature information, a result of recognizing a class of an object in the input image as output data, i.e., an information signal.

Moreover, the learning module 110 and the data recognition module 120 may be each implemented as software, hardware, or a combination of hardware and software. In an embodiment, the learning module 110 and the data recognition module 120 may be implemented in the form of software in an operating system (OS), a lower-level layer, or as programs that may be loaded into a memory provided in the electronic system 100 and executed by at least one processor of the electronic system 100.

Figure 2:
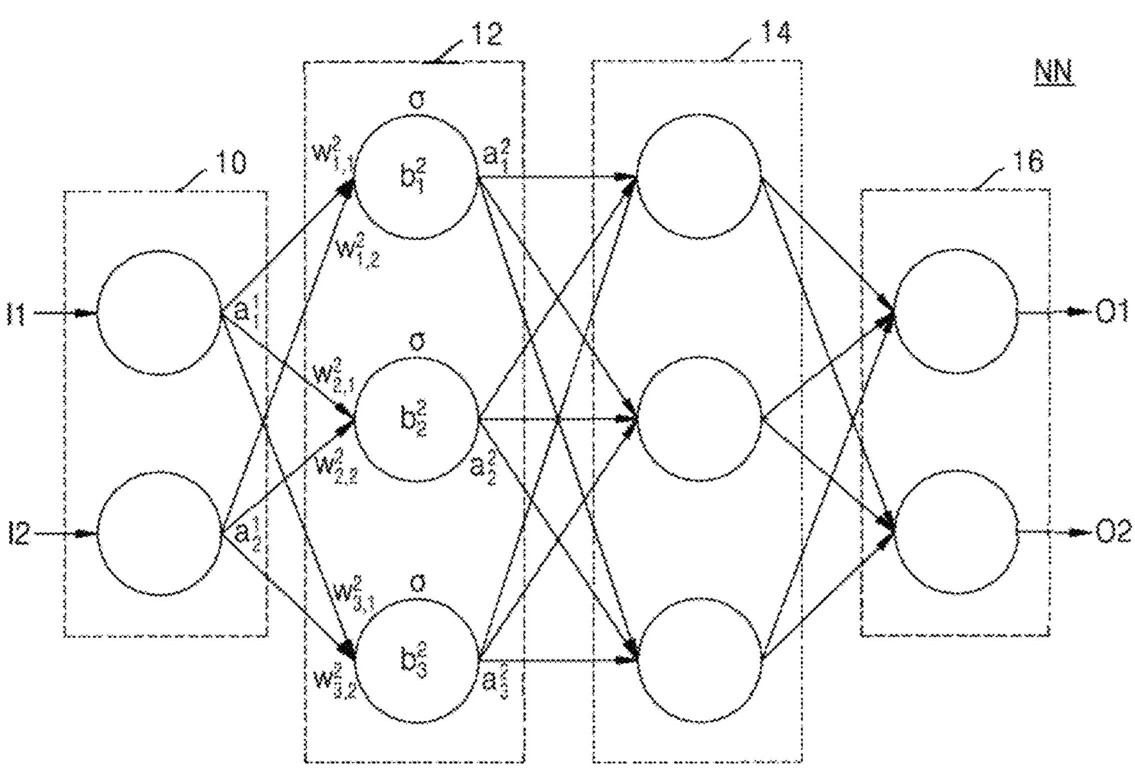
FIG. 2 illustrates an example of a neural network applied to a neural network system according to an example embodiment of the inventive concept.

FIG. 2 illustrates an example of a neural network applied to a neural network system according to an example embodiment of the inventive concept.

Referring to FIG. 2, a neural network NN may have a structure including an input layer, hidden layers, and an output layer. The neural network NN may perform computations based on received input data (e.g., I1 and I2) and generate output data (e.g., O1 and O2) based on a result of the computations.

The neural network NN may be a DNN or an N-layer neural network with two or more hidden layers. For example, as shown in FIG. 2, the neural network NN may be a DNN with a plurality of layers, i.e., an input layer 10, first and second hidden layers 12 and 14, and an output layer 16.

The layers, i.e., the input layer 10, the first and second hidden layers 12 and 14, and the output layer 16, may be implemented as a convolutional layer, a fully-connected layer, a softmax layer, etc. For example, the convolution layer may include convolution, pooling, and active function operations. Alternatively, each of the convolution, pooling, and active function operations may form a layer.

An output of each of the input layer 10, the first and second hidden layers 12 and 14, and the output layer 16 may be referred to as features (or feature maps). Each of the input layer 10, the first and second hidden layers 12 and 14, and the output layer 16 may receive features generated in the previous layer as input features, perform a computation on the input features, and generate an output feature or an output signal. Features are data representing various characteristics of input data that may be recognizable by the neural network NN.

When the neural network NN has a DNN structure, the neural network NN includes more layers capable of extracting valid information. Therefore, the neural network NN may process complex data sets. While the neural network NN has been described to include four layers, i.e., the input layer 10, the first and second hidden layers 12 and 14, and the output layer 16, this is merely an example, and the neural network NN may include fewer or more layers. Furthermore, the neural network NN may include layers with various structures other than the structure shown in FIG. 2.

Each of the input layer 10, the first and second hidden layers 12 and 14, and the output layer 16 included in the neural network NN may include a plurality of neurons. Neurons may correspond to a plurality of artificial nodes, known as processing elements (PEs), units, or similar terms. For example, as shown in FIG. 2, the input layer 10 may include two neurons (nodes), and each of the first and second hidden layers 12 and 14 may include three neurons (nodes). However, this is merely an example, and each of the layers in the neural network NN may include various numbers of neurons (nodes).

Neurons included in each of the input layer 10, the first and second hidden layers 12 and 14, and the output layer 16 included in the neural network NN may be connected to those in the next layer to exchange data with one another. A neuron may receive data from other neurons, perform a computation on the received data, and output a result of the computation to other neurons.

An input and an output of each of the neurons (nodes) may be respectively referred to as input activation and an output activation. Additionally or alternatively, an activation may serve both as an output from a neuron and parameters corresponding to inputs to neurons in the next layer. Moreover, each of the neurons may determine an activation based on activations $$\left(\text{e.g., } a_1^2, a_2^2, a_3^2, \text{ etc.}\right),$$

weights $$\left(\text{e.g., } w_{1,1}^2, w_{1,2}^2, w_{2,1}^2, w_{2,2}^2, w_{3,1}^2, w_{3,2}^2, \text{ etc.}\right),$$

and biases $$\left(\text{e.g., } b_1^2, b_2^2, b_3^2, \text{ etc.}\right),$$

Figure 3:
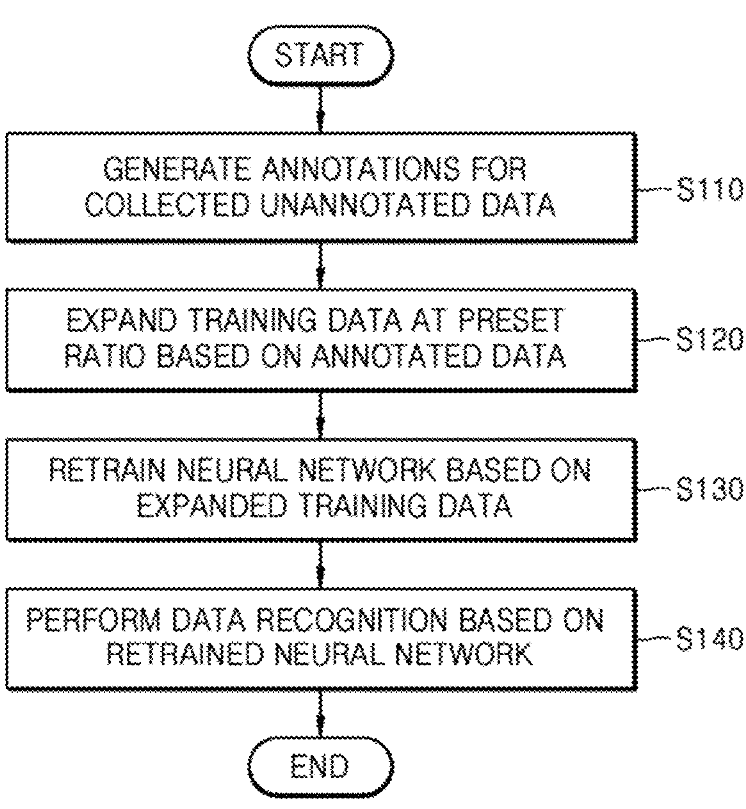
FIG. 3 is a flowchart of an operation method of a neural network system, according to an example embodiment of the inventive concept.

Activations, weights, and biases may be received from neurons in a previous layer. Weights and a bias are parameters used to calculate an output activation in each neuron, and each weight is a value assigned to a connectivity relation between neurons while a bias represents a weight associated with an individual neuron. As described with reference to FIG. 1, the neural network NN may determine parameters such as weights and biases via training based on training data, such as machine learning. FIG. 3 is a flowchart of an operation method of a neural network system, according to an example embodiment of the inventive concept. The operation method of FIG. 3 may be performed in the electronic system 100 of FIG. 1, and descriptions with respect to FIG. 1 may be applied to this embodiment.

Referring to FIGS. 1 and 3, the learning module 110 may generate an annotation for collected unannotated data (operation S110). According to an embodiment, the learning module 110 may extract an annotation for collected data by performing inference on the collected data with a neural network trained based on initial training data. In this case, a reliability of the annotation may be extracted together with the annotation.

Figure 4A:
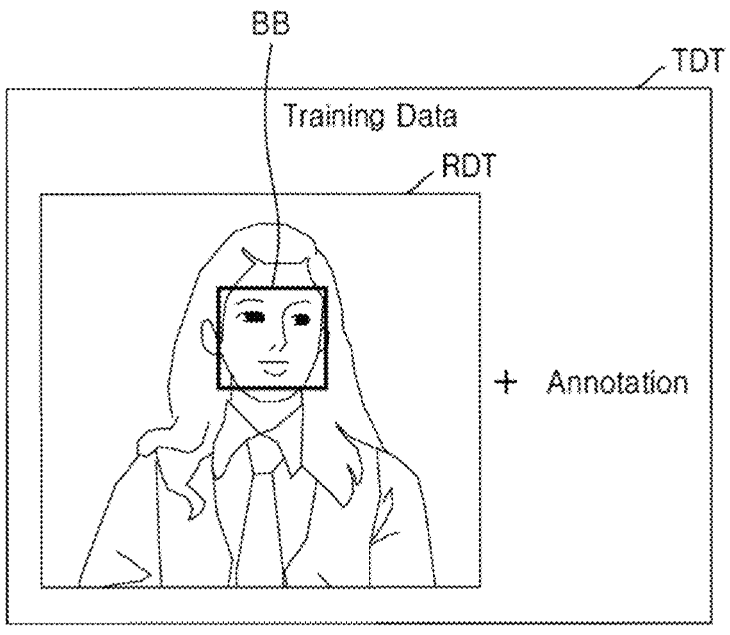
FIG. 4A illustrates training data.
Figure 4B:
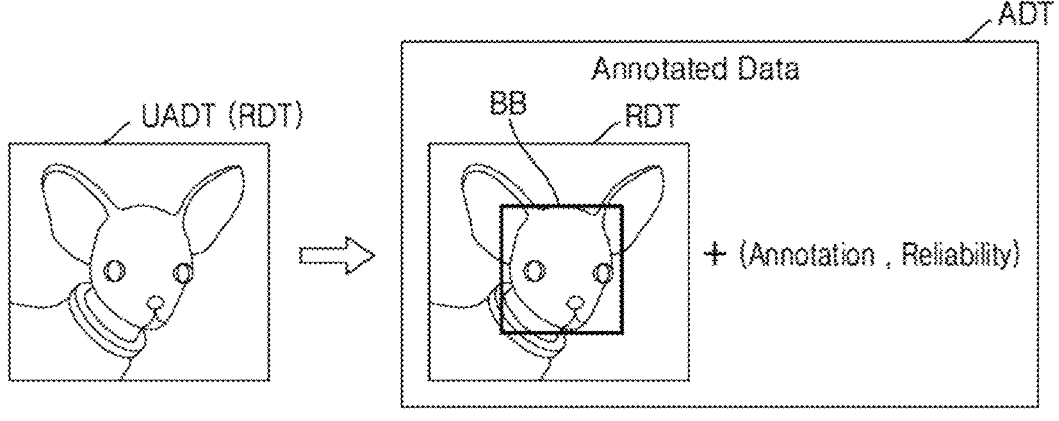
FIG. 4B illustrates an example of annotated data according to an example embodiment of the inventive concept.

FIG. 4A illustrates training data and FIG. 4B illustrates an example of annotated data according to an example embodiment of the inventive concept. FIGS. 4A and 4B illustrate image data as an example.

Referring to FIG. 4A, training data TDT may include raw data RD and a corresponding annotation. The annotation is a result output from a neural network and may include, for example, a class, a bounding box (BB), an object detection result, etc. For example, when the neural network detects a person's or animal's face and a location of the face, as shown in FIG. 4A, an annotation may include information about a BB indicating a person's face and a location (e.g., a position and a size of the BB, pixels within the BB, etc.) and information about a class (e.g., a person, a woman, etc.) represented by the person's face.

Referring to FIG. 4B, unannotated data UADT, such as collected data, includes raw data RDT, and annotation may be generated for the raw data RDT in operation S110 of FIG. 3 and labeled on the raw data RDT. As shown in FIG. 4B, the annotation may include information about a BB indicating a cat's face and a location and information about a class (e.g., a cat and a type of cat) represented by the cat's face. In this case, reliability of the annotation may be labeled on the raw data RDT together with the annotation. In this way, annotated data ADT may be generated. For example, the annotation may include class information corresponding to a cat, and reliability of the annotation may increase as a cat image in the unannotated data UADT becomes more similar to a cat image in training data TDT. Additionally or alternatively, the reliability of the annotation may be higher as a feature in the unannotated data UADT becomes more similar to a feature in the training data TDT.

Referring back to FIG. 3, the learning module 110 may expand training data by an amount corresponding to a preset ratio based on collected data with the generated annotation (operation S120). According to an embodiment, the learning module 110 may expand training data based on data determined to have relatively high reliability or have reliability greater than or equal to a threshold value from among the collected data with the generated annotation. The learning module 110 may increase the amount of data by transforming data with high reliability based on various methods and selectively add at least some of the transformed versions of data as training data based on the reliability.

The learning module 110 may add an amount of training data corresponding to a preset ratio. For example, the learning module 110 may add an amount of training data corresponding to a preset ratio of an amount of currently available training data, e.g., an amount of initial training data. For example, the ratio may be a real number greater than 0 but less than or equal to 1. For example, when 1000 pieces of image data are stored in the training database 130 as current training data, and the preset ratio is 0.2, the learning module 110 may add 200 pieces of training data based on the collected data with the generated annotation.

The learning module 110 may retrain a neural network based on the expanded training data (operation S130). Accordingly, the performance of the neural network may be increased. According to an embodiment, the learning module 110 may evaluate the performance of the retrained neural network. When the performance of the neural network is degraded below a threshold level or degraded to a great extent, the learning module 110 may recover training data and the neural network to an original state. According to an embodiment, the learning module 110 may perform operations S120 and S130 again to obtain a neural network with increased performance.

The data recognition module 120 may perform data recognition based on the retrained neural network (operation S140). The data recognition module 120 may run the neural network and perform inference on input data based on the neural network to obtain an information signal for the input data.

As described above, according to an embodiment of the inventive concept, the neural network system may generate an annotation for unannotated data and expand training data by using annotated data. The neural network system may obtain and use a neural network with increased performance by retraining the neural network based on the expanded training data. As described with reference to FIG. 3, a recognition rate of the neural network may be increased by iteratively performing augmentation of training data and retraining of the neural network.

Figure 5:
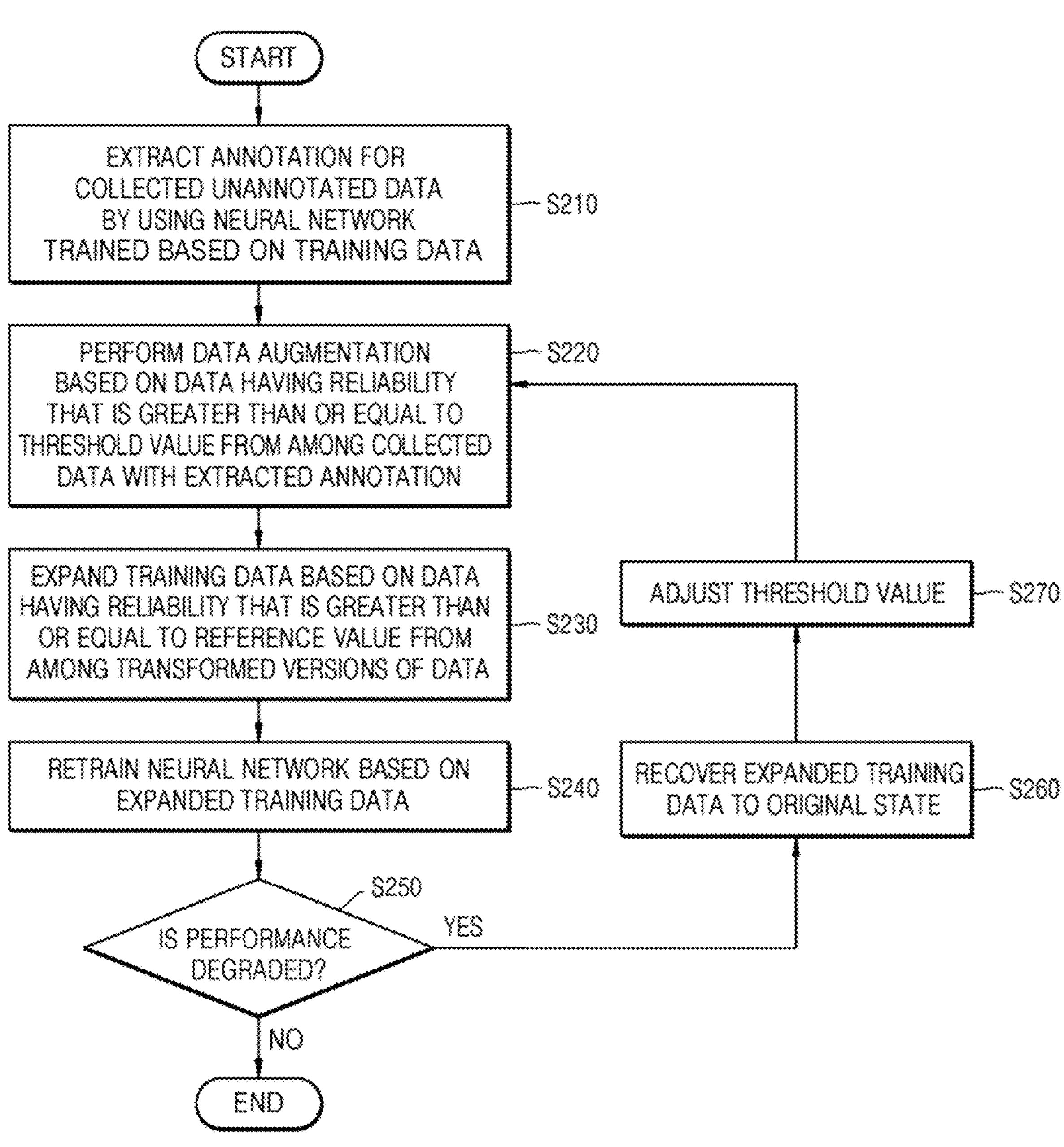
FIG. 5 is a flowchart of a training data augmentation method according to an example embodiment of the inventive concept.

FIG. 5 is a flowchart of a training data augmentation method according to an example embodiment of the inventive concept. The training data augmentation method of FIG. 5 may be performed in the learning module 110 of FIG. 1, and descriptions already provided above with respect to FIGS. 1 and 3 may be applied to this embodiment.

Referring to FIGS. 1 and 5, the learning module 110 may extract an annotation for collected unannotated data by using a neural network trained based on training data (for example, initial training data) (operation S210). In this case, reliability of the annotation may be extracted together with the annotation. For example, when the neural network performs multi-class classification, the learning module 110 may run the neural network to perform inference on collected data and extract a plurality of classes matching the collected data and a reliability value for each of the classes as a result of the inference.

Thus, the reliability values may be extracted by the neural network along with the annotation data. In one example, the neural network is trained to produce the annotation data using a different training task (e.g., a different loss function) than the training task used to train the network to produce the annotation data. Additionally or alternatively, a single training task may be used that incorporates the predicted reliability value. In one example, the neural network may output annotation data including multiple classification categories along with a soft (i.e., non-binary) value for each category, and the reliability may be determined based on the soft values. In some examples, reliability data may be inferred for individual inputs, whereas in other examples, reliability values may be determined for collections of input values.

The learning module 110 may perform data augmentation based on data with a reliability greater than or equal to a threshold value from among collected data with the extracted annotation (operation S220). In an embodiment, the learning module 110 may select a piece of collected data with a reliability greater than or equal to a threshold value as reference data and perform data augmentation based on the reference data. For example, the learning module 110 may consider collected data with a reliability greater than or equal to a threshold value as ground truth data and select the collected data as reference data corresponding to parent data in data augmentation.

The learning module 110 may transform the reference data by using various methods to generate a number of transformed versions of the reference data. For example, as shown in FIG. 4B, when the reference data is image data including a cat's face, and an annotation includes information about a BB indicating the cat's face and a location, the learning module 110 may transform the image data by using various methods such as cropping, rotation, color change, noise addition, etc. Accordingly, a number of transformed versions of the image data may be generated.

In this case, an annotation of each transformed version of the reference data (e.g., a transformed version of the image data) may be the same as an annotation of the reference data (e.g., the image data before transformation). For example, the transformed version of image data may include the cat's face and information about the BB, indicating the location of the cat's face. However, reliability of the transformed version of image data may be reduced. According to an embodiment, the learning module 110 may perform inference on a transformed version of image data by using the neural network and extract a reliability of the transformed version of image data.

The learning module 110 may expand training data based on data with a reliability greater than or equal to a reference value from among transformed versions of the data (operation S230). The learning module 110 may add, as training data, data with a reliability greater than or equal to a predefined reference value among transformed versions of the data, and as described with respect to operation S120 of FIG. 3, the learning module 110 may add an amount of training data corresponding to a preset ratio. In this case, the learning module 110 may add, as training data, a transformed version of the data with relatively high reliability or a transformed version of the data with relatively low reliability (but greater than the reference value) according to the purpose of the neural network. According to an embodiment, the learning module 110 may select data to be added as training data among the transformed versions of data based on a reliability distribution, as described in detail below with reference to FIGS. 9A through 10B.

The learning module 110 may retrain the neural network based on the expanded training data (operation S240).

The learning module 110 may determine whether the performance of the retrained neural network is degraded (operation S250). The learning module 110 may evaluate the performance of the retrained neural network. The learning module 110 may evaluate whether the performance of the neural network is degraded in various aspects based on the purpose of the neural network.

When the performance of the neural network is degraded below a threshold level or degraded to a great extent, the learning module 110 may recover the expanded training data to an original state (operation S260). Additionally or alternatively, when the performance of the neural network retrained based on the expanded training data is determined to be excessively degraded, the learning module 110 may determine expansion of the training data to be inadequate and restore the expanded training data to an original state prior to the expansion The learning module 110 may adjust the threshold value (operation S270) and perform again operations S220 through S250. For example, the learning module 110 may increase the threshold value related to the reliability. Additionally or alternatively, the learning module 110 may expand training data based on data with a higher reliability and retrain the neural network based on the expanded training data.

A method of increasing the amount of training data may be used to increase the performance of the neural network or prevent the neural network from overfitting. However, when the existing training data, e.g., initial training data, is simply transformed via data augmentation and the transformed data is added as training data, the amount of training data may be increased, but the accuracy or normalization effect of the neural network may be reduced. Rather than increasing the amount of training data, a method includes identifying features from a feature map in input data based on a clustering technique and determining the number of groups based on a distribution in which features are divided into clusters. According to this method, when input data is unevenly distributed or a distance between features varies, the neural network may derive an incorrect result.

However, as described above with reference to FIGS. 1 through 5, the neural network training method performed by the neural network system, according to example embodiments of the inventive concept, may increase the amount of training data by extracting an annotation for collected data that may be unannotated data and adding training data at a preset ratio based on a reliability of annotated data (for example, the collected data with extracted annotation) or reliability of data transformed based on the annotated data. According to this method, the performance of the neural network, such as accuracy or normalization effect, may be increased because the collected data may be continuously added as training data.

Accordingly, a method of training a neural network may include training the neural network based on initial training data; performing inference on additional data using the trained neural network to produce annotation data; selecting a portion of the additional data based on a corresponding portion of the annotation data having a reliability above a predetermined threshold; and retraining the neural network based on the initial training data and the selected portion of the additional data along with the corresponding portion of the annotation data.

Figure 6:
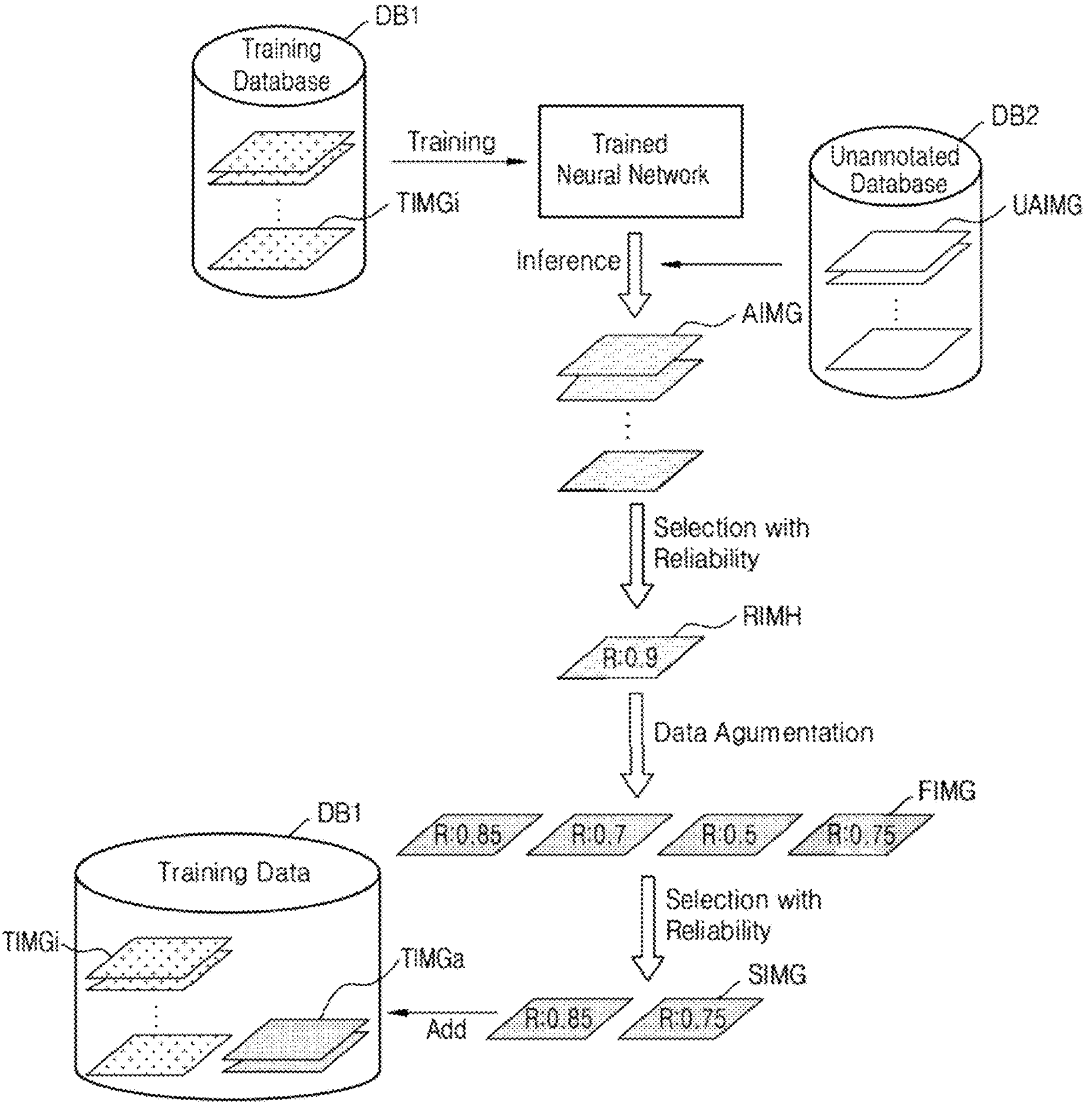
FIG. 6 illustrates a training data augmentation method according to an example embodiment of the inventive concept.

FIG. 6 illustrates a training data augmentation method according to an example embodiment of the inventive concept. For the convenience of description, input data for a neural network is assumed to be an image.

Referring to FIG. 6, a first database DB1 may include a plurality of initial training images TIMGi. The first database DB1 may be a training database. The neural network may be trained based on an initial training image TIMGi.

A second database DB2, such as an external database, may include a plurality of unannotated images UAIMG. For example, an unannotated image UAIMG may be an image obtained with a camera of an electronic device to which a neural network system is applied, or an image collected via a communication network.

An inference may be performed on the unannotated images UAIMG based on the trained neural network. Accordingly, an annotation and a reliability may be extracted for each of the unannotated images UAIMG. An annotation and a reliability may be labeled for each of the unannotated images UAIMG. Additionally or alternatively, a plurality of annotated images AIMG may be generated.

An image with a reliability R greater than or equal to a threshold value may be selected from among the annotated images AIMG. For example, when the threshold value is 0.9, an image with a reliability R of 0.9 or above may be selected as a reference image RIMG.

Data augmentation may be performed based on the reference image RIMG. A plurality of transformed versions of images FIMG may be generated by transforming the reference image RIMG in various ways. The transformed versions of images FIMG include the same annotation as the reference image RIMG but may each have a reliability R lower than that of the reference image RIMG. For example, the transformed versions of images FIMG may have reliabilities R of 0.85, 0.7, 0.5, and 0.75, respectively.

At least one of the transformed versions of images FIMG may be selected based on reliabilities R. For example, a transformed version of an image FIMG with a reliability R greater than or equal to a reference value may be selected. For example, when the reference value is 0.75, images with reliabilities R of 0.75 and 0.85 may be selected from among the transformed versions of images FIMG.

The selected images SIMG may be added to the first database DB1 as a training image. The first database DB1 may include the initial training images TIMGi and a plurality of added images TIMGa. Therefore, the number of training images may be increased. Additionally or alternatively, the first database DB1 may be expanded.

Figure 7:
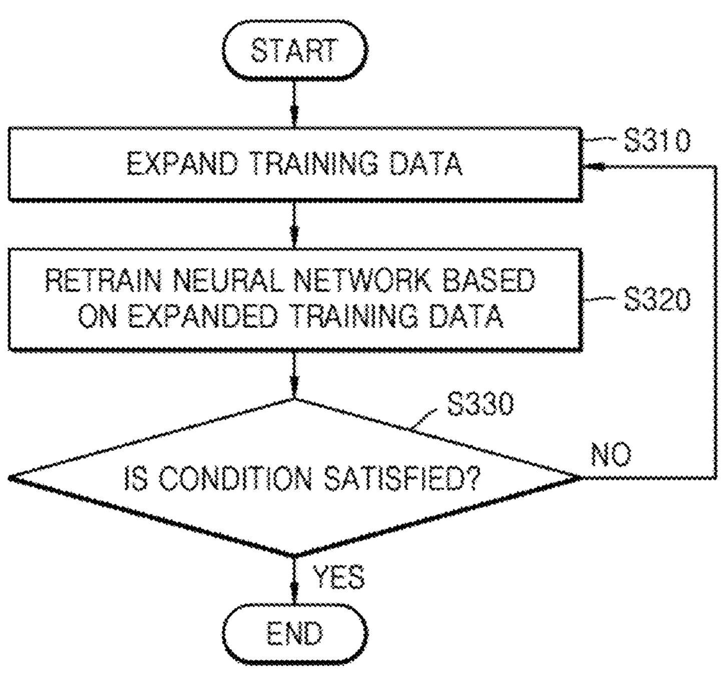
FIG. 7 is a flowchart of a neural network training method performed by a neural network system, according to an example embodiment of the inventive concept.

FIG. 7 is a flowchart of a neural network training method performed by a neural network system, according to an example embodiment of the inventive concept. The neural network training method of FIG. 7 may be performed in the electronic system 100 of FIG. 1, and descriptions already provided above with respect to FIGS. 1 through 6 may be applied to this embodiment.

Referring to FIGS. 1 and 7, the learning module 110 may expand training data (operation S310) and retrain a neural network based on the expanded training data (operation S320). Descriptions with respect to operations S310 and S320 are already provided above with reference to FIG. 5, and are not repeated.

Thereafter, the learning module 110 may check whether a preset condition is satisfied (operation S330). For example, the condition may be a condition for finishing a training phase.

In an embodiment, the learning module 110 may check whether the amount of added training data is greater than or equal to a preset amount. Additionally or alternatively, the learning module 110 may determine whether the amount of added training data is sufficient. The amount of added training data may be predetermined, and the learning module 110 may determine whether the amount of added training data is greater than or equal to the preset amount. For example, in the case where initial training data includes 1,000 images, and the same number of images as those in the initial training data are set to be added as training data, the learning module 110 may determine that the condition is satisfied when the number of added training images is greater than or equal to 1,000

In an embodiment, the learning module 110 may determine whether the condition is satisfied based on the performance of the retrained neural network. For example, the learning module 110 may measure the performance of the retrained neural network. When the measured performance is greater than or equal to a reference level, the condition may be determined to be satisfied.

When the condition is not determined to be satisfied, the learning module 110 may perform operations S310 and S320 again. For example, the learning module 110 may repeatedly perform operations S310 and S320 until the number of added training images reaches 1,000. As another example, the learning module 110 may repeatedly perform operations S310 and S320 until the performance of the retrained neural network reaches the reference level.

When the condition is determined to be satisfied, the learning module 110 may finish a training phase.

Figure 8:
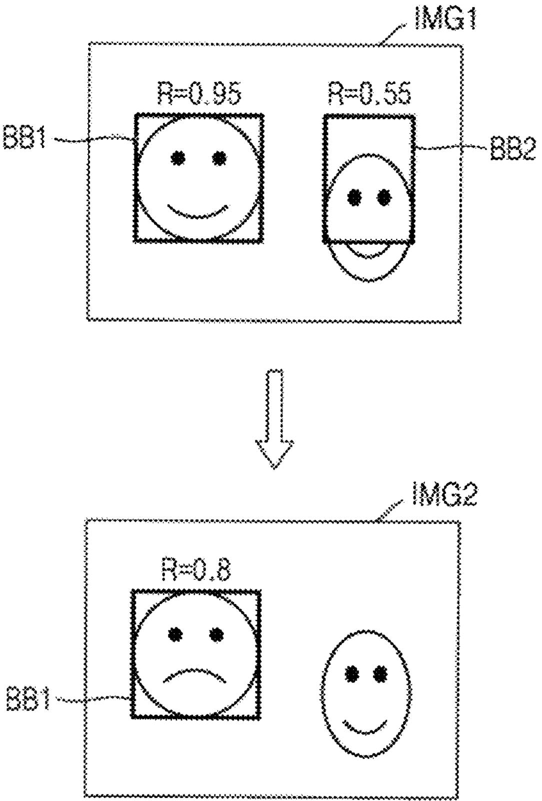
FIG. 8 is a diagram for explaining an inference result from a neural network system and data augmentation according to an example embodiment of the inventive concept.

FIG. 8 is a diagram for explaining an inference result from a neural network system and data augmentation according to an example embodiment of the inventive concept. FIG. 8 is a diagram for explaining operations S210 and S220 of FIG. 5.

Referring to FIG. 8, inference is performed based on a trained neural network, and a result of the inference may be extracted according to the purpose of the neural network (i.e., based on the task the neural network was trained for). For example, as shown in FIG. 8, input data may be an image, and information about a face and a location and an area of the face may be extracted as an inference result. For example, pieces of information about faces and first and second BBs, BB1 and BB2, each including information about a location and an area of the face, may be extracted for a first image IMG1. In this case, a reliability R of BB1 may be 0.95, and a reliability R of the BB2 may be 0.55.

Data augmentation may be performed on an image with a reliability greater than a threshold value. For example, when the threshold value is 0.8, image transformation may be performed on an image in the first BB BB1 with the reliability R of 0.95. For example, as shown in FIG. 8, a facial expression may be changed. Furthermore, image transformation may be performed, such as adding noise, rotating an image, or cropping a part of a face from an image. In a transformed version of the image, information about the first BB BB1 remains unchanged, but the reliability R of the first BB, BB1, may be reduced. For example, in a second image IMG2 that may be a transformed version of an image, the reliability R of the first BB BB1 may be reduced to 0.8.

Figure 9A:
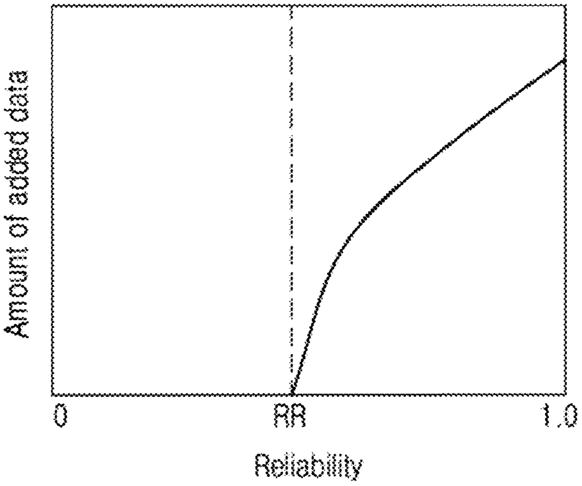
FIGS. 9A and 9B illustrate reliability distributions according to example embodiments of the inventive concept.
Figure 9B:
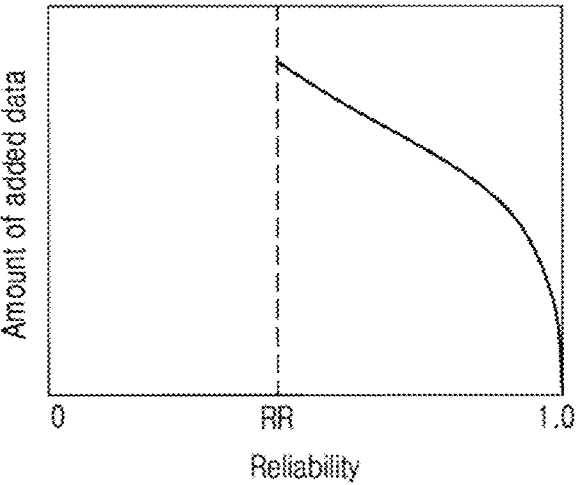

FIGS. 9A and 9B illustrate reliability distributions according to example embodiments of the inventive concept. The reliability distributions of FIGS. 9A and 9B may be used in an operation of expanding training data, e.g., in operation S230 of FIG. 5. In the graphs of FIGS. 9A and 9B, the abscissa and ordinate respectively represent reliability and the amount of data added as training data.

Referring to FIG. 9A, the reliability distribution may be set such that data with relatively high reliability among data with a reliability greater than or equal to a reference value RR is added as training data. Accordingly, when the data is added as training data, i.e., when data similar to training data ("the existing training data") already used to train a neural network is added to the existing training data, this may augment the existing training data.

Additionally or alternatively, referring to FIG. 9B, the reliability distribution may be set such that data with relatively low reliability among data with a reliability greater than or equal to the reference value RR is added as training data. Accordingly, when the data is added as training data, i.e., when data dissimilar from training data ("the existing training data") already used to train a neural network is added to the existing training data, new data not included in the existing training data may be added as the training data. For example, when the neural network performs a vehicle detection operation, data regarding a new vehicle may be added as training data even when the new vehicle is launched.

Figure 10A:
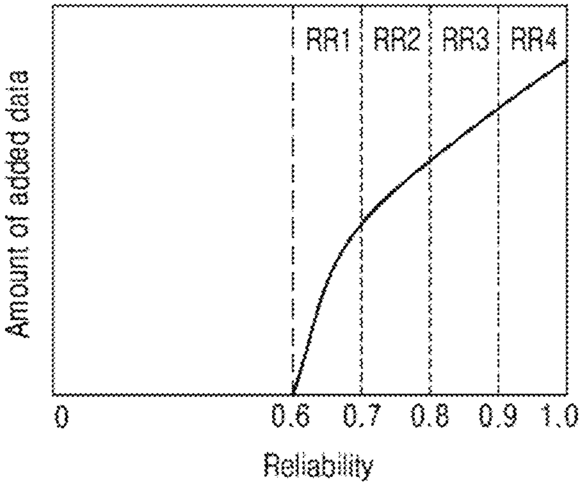

FIGS. 10A and 10B illustrate a method, performed by a neural network system, of adding data to training data based on a reliability distribution, according to an example embodiment of the inventive concept.

Referring to FIG. 10A, data with a reliability greater than or equal to a reference value of 0.6 may be added as training data. In this case, a reliability region corresponding to a reliability of 0.6 or above may be divided into a plurality of reliability ranges, i.e., first through fourth reliability ranges RR1 through RR4, and as shown in FIG. 10B, a ratio of the amount of data to be added to a total amount of data to be added as training data may be set for each of the first through fourth reliability ranges RR1 through RR4. For example, when a total of 100 images are added as training data, 5 images included in the first reliability range RR1, 10 images included in the second reliability range RR2, 25 images included in the third reliability range RR3, and 60 images included in the fourth reliability range RR4 may be added as training data.

FIGS. 11 through 14 respectively illustrate an addition of training data according to example embodiments of the inventive concept. For the convenience of explanation, training data is assumed to be an image.

Figure 11:
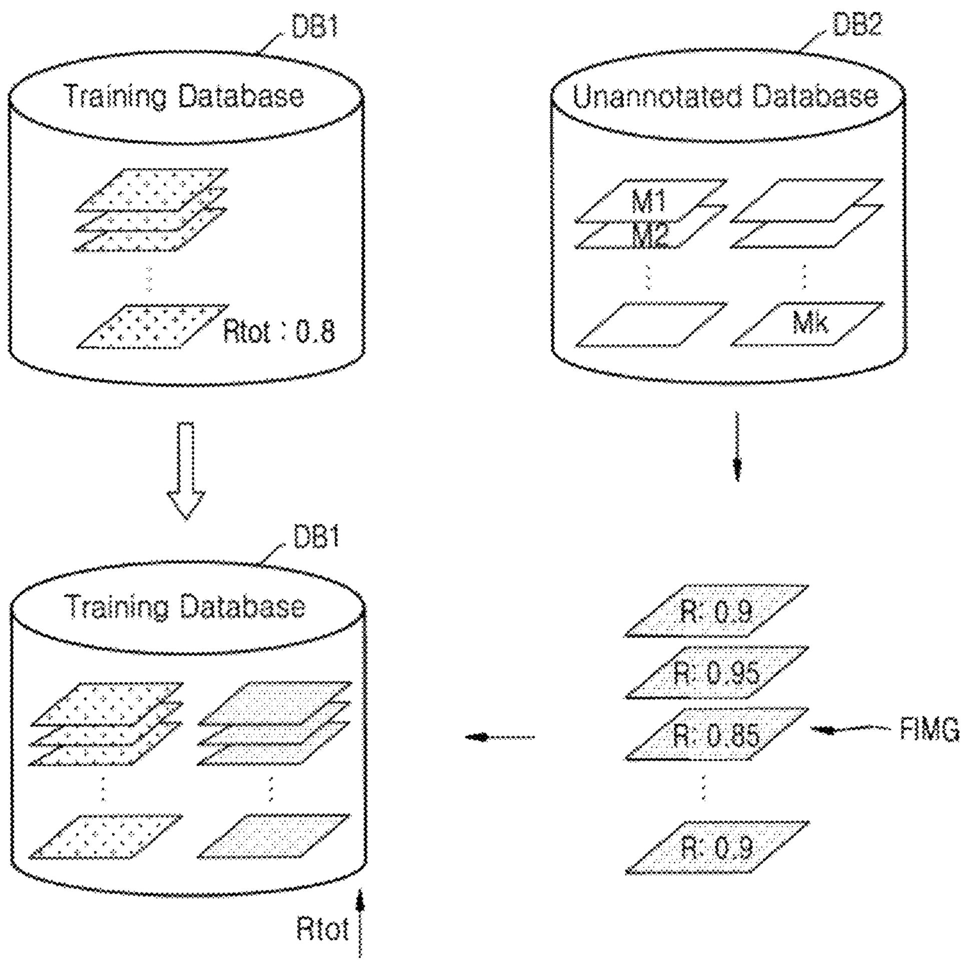

FIG. 11 shows an example in which a reliability of training data is increased due to an addition of training data.

Referring to FIG. 11, a first database DB1, e.g., a training database, may include a plurality of training images. In this case, a total reliability Rtot of the training images may be 0.8. A second database DB2, e.g., an unannotated database, may include a plurality of collected images M1 through Mk (k is a positive integer), inference is performed on the collected images M1 through Mk by using a neural network trained based on the first database DB1, and accordingly, annotation and reliability of the annotation may be extracted for each of the collected images M1 to Mk. Therefore, a plurality of annotated images may be generated. Additionally or alternatively, a plurality of transformed versions of images FIMG may be generated by performing data augmentation based on an image with a relatively high reliability from among the plurality of annotated images.

An image with a high reliability from among the transformed versions of images FIMG, e.g., an image with a reliability of 0.85 or above, may be added to the first database DB1 as training data. Accordingly, a total reliability Rtot of expanded training data, i.e., a plurality of training images included in the first database DB1, may be increased.

In this way, even when the reliability of initial training data is low, the reliability of training data may be increased by adding training data with a high reliability.

Figure 12:
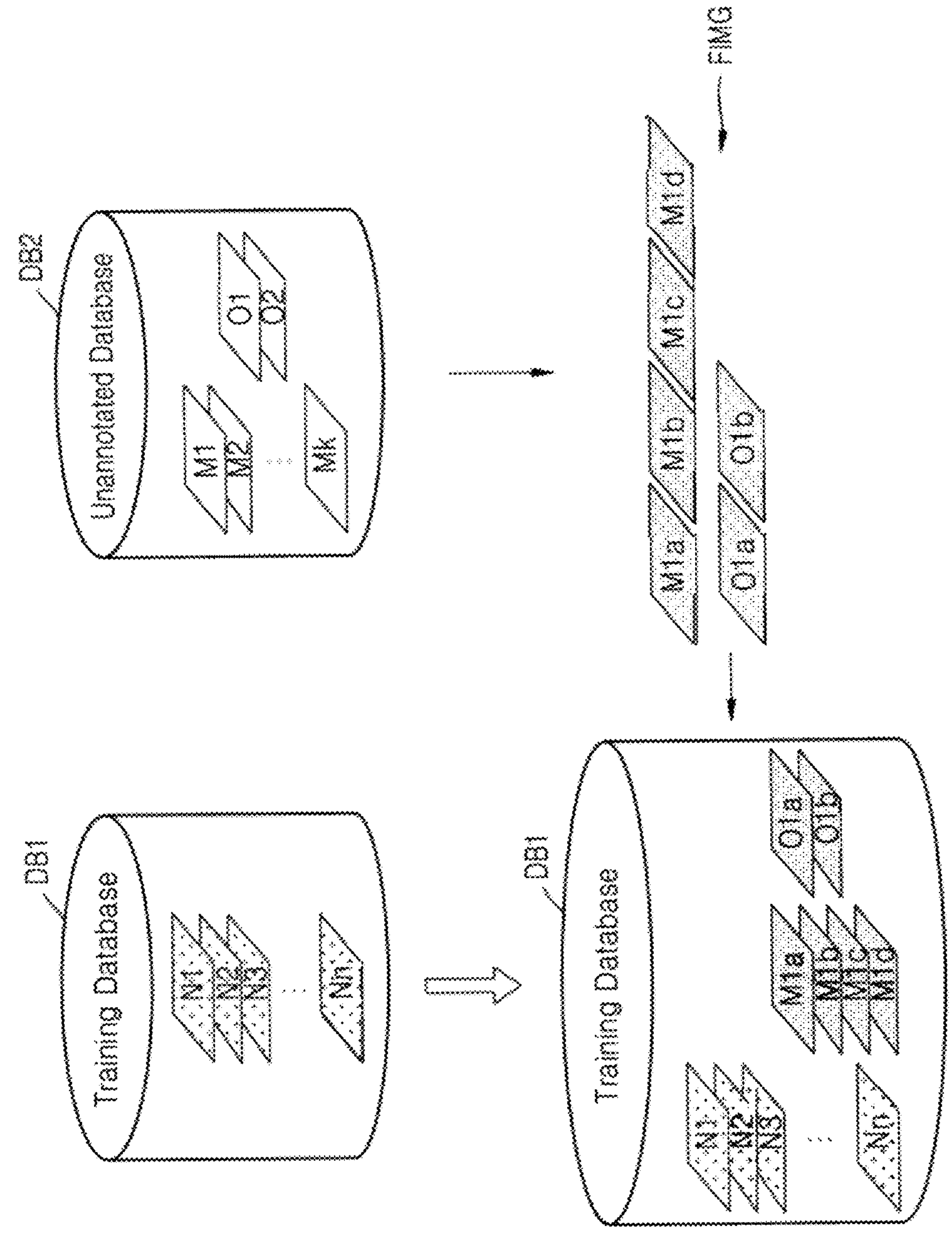

FIG. 12 shows an example in which certain data is added as training data. FIG. 12 shows an addition of training data and a result of the addition of training data in a device used by a certain user, e.g., a mobile terminal such as a smartphone, a tablet PC, or the like.

Referring to FIG. 12, a first database DB1 may include a plurality of training images N1 through Nn. A second database DB2 may include collected images M1 through Mk, O1, and O2 (k is a positive integer). In this case, the collected images M1 through Mk may be a user's images, and the collected images O1 and O2 may be other images such as another user's images. The user's images may be stored in the second database DB2 because the mobile terminal is used by the user.

Inference may be performed on the collected images M1 through Mk, O1, and O2 by using a neural network trained based on the first database DB1, and accordingly, annotations and reliabilities of the annotations may be extracted for the collected images M1 through Mk, O1, and O2. Therefore, a plurality of annotated images may be generated. Furthermore, a plurality of transformed versions of images FIMG may be generated by performing data augmentation on an image with relatively high reliability from among the plurality of annotated images.

The transformed versions of images may include images M1a, M1b, M1c, and M1d obtained by transforming a user's image, e.g., a collected image M1, and images O1a and O1b obtained by transforming the other user's image, e.g., a collected image O1. In a mobile terminal, the transformed versions of images FIMG may include images obtained by transforming a user's image.

At least some of the transformed versions of images FIMG may be added to the first database DB1 as training data. Accordingly, a proportion of images related to the user in the expanded training data, i.e., a plurality of training images included in the first database DB1, may be increased.

For example, in the case of a neural network that detects a person's face in an image from a mobile terminal, e.g., an image captured by a camera, and adds a tag (e.g., a name, etc.) to the image, a range of images in which detection is to be performed may be limited due to characteristics of the mobile terminal. For example, an image in which detection is to be performed may be a user's image. According to this embodiment, due to an increase in a proportion of a user's images in the training data, a neural network retrained based on the training data may exhibit increased performance in detecting a user's face in an image.

Figure 13:
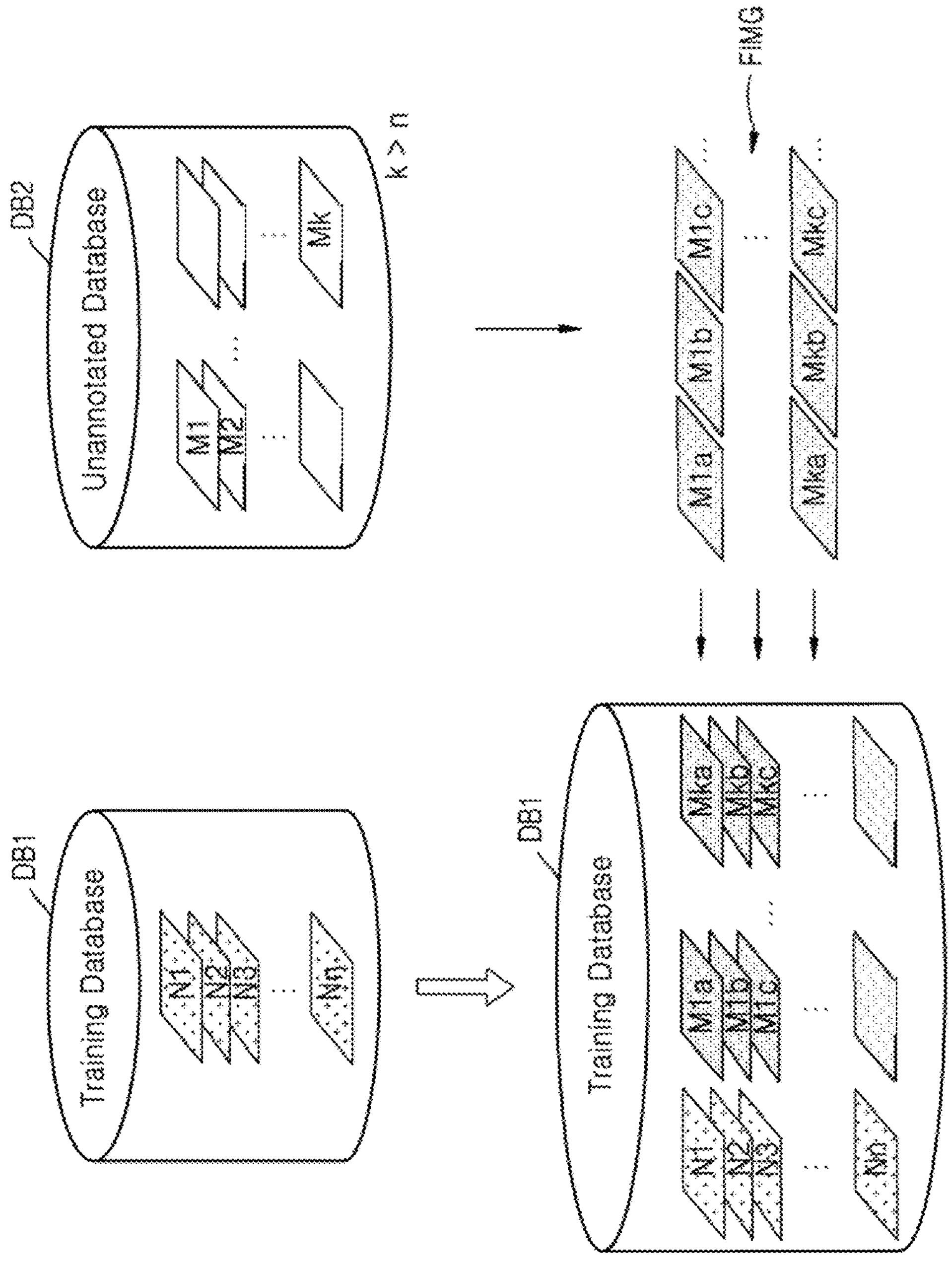

FIG. 13 shows an example in which a relatively large amount of training data is added to a small amount of training data.

Referring to FIG. 13, a first database DB1 includes a plurality of training images N1 through Nn, and a second database DB2 includes a plurality of collected images M1 through Mk. In this case, the number of collected images M1 through Mk may be significantly greater than the number of training images N1 through Nn.

Inference may be performed on the collected images M1 through Mk by using a neural network trained based on the first database DB1, and accordingly, annotations and reliabilities of the annotations may be extracted for the collected images M1 through Mk. Therefore, a plurality of annotation images may be generated. Furthermore, data augmentation may be performed based on an image with relatively high reliability from among the plurality of annotated images.

A number of transformed versions of images FIMG (e.g., M1a through Mkc) may be added to the first database DB1. Accordingly, a proportion of added data in the training data in the first database DB1 may be increased.

In the case of medical images used to diagnose diseases such as cancer and detect a growth plate, there may be a small number of annotated training images. Additionally or alternatively, there may be a number of unannotated images, i.e., collected images, obtained as a result of a test or examination. When a neural network is trained with respect to a small number of training images, the neural network may be trained without taking into account factors such as different ages, genders, complications, etc., thereby degrading the accuracy of the neural network. However, according to a training method of an embodiment of the inventive concept, unannotated images may be used as training images and the accuracy of the neural network may be increased.

FIG. 14 shows an example in which a large amount of training data is added to a large amount of training data.

Referring to FIG. 14, a first database DB1 includes a plurality of training images N1 through Nn, and a second database DB2 includes a plurality of collected images M1 through Mk.

Inference may be performed on the collected images M1 through Mk by using a neural network trained based on the first database DB1, and accordingly, annotations and reliabilities of the annotations may be extracted for the collected images M1 through Mk. Therefore, a plurality of annotation images may be generated. Furthermore, data augmentation may be performed based on an image with relatively high reliability from among the plurality of annotated images. A number of transformed versions of images FIMG (e.g., M1a through Mkc) may be added to the first database DB1.

For example, when the neural network performs a vehicle detection operation, the neural network may be trained based on a large amount of training data. However, when a new vehicle enters a market, or environmental changes (e.g., snow, rain, and lightning) occur, detection performance of the neural network may be degraded. However, according to a training method of an embodiment of the inventive concept, continuously collected image data may be added as training data. Accordingly, the neural network may be retrained based on the expanded training data, thereby preventing deterioration in performance of the neural network.

Figure 15:
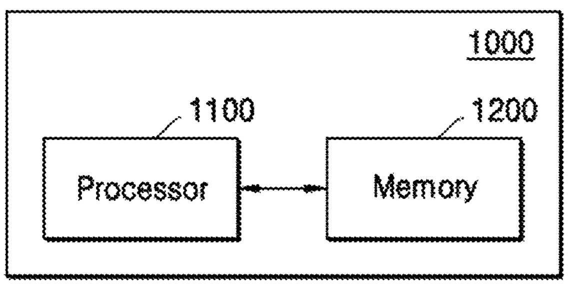
FIG. 15 is a block diagram of a configuration of a neural network training device according to an example embodiment of the inventive concept.

FIG. 15 is a block diagram of a configuration of a neural network training device 1000 according to an example embodiment of the inventive concept.

Referring to FIG. 15, the neural network training device 1000 may include a processor 1100 and a memory 1200. Although FIG. 15 shows that the neural network training device 1000 includes one processor 1100, embodiments are not limited thereto, and the neural network training device 1000 may include a plurality of processors.

The processor 1100 may include one or more cores (not shown), a GPU (not shown), and/or a connecting passageway (e.g., a bus) for exchanging signals with other components.

The processor 1100 may perform operations of the learning module 110, described above with reference to FIGS. 1 through 14, such as an expansion of training data and retraining. For example, the processor 1100 may perform inference on collected data by using a neural network trained based on training data included in a training database, e.g., initial training data to extract annotations for the collected data, add training data based on reference data with an annotation with a reliability greater than or equal to a threshold value from among the annotated data, and retrain the neural network based on the added training data and the initial training data. The processor 1100 may add training data according to a set ratio and repeat the addition of training data until the amount of added training data reaches a set amount, i.e., a set amount of the addition, or until the performance of the neural network reaches a reference level.

Moreover, the processor 1100 may further include random access memory (RAM) (not shown) and read-only memory (ROM) (not shown) for temporarily or permanently storing signals (or data) processed within the processor 1100. Furthermore, the processor 1100 may be implemented in the form of a system on chip (SoC) including at least one of a GPU, RAM, and ROM.

The memory 1200 may store programs (one or more instructions) for processing and controlling the processor 1100. The memory 1200 may include a plurality of modules in which the functions of the learning module 110 and the data recognition module 120 described with reference to FIG. 1 are implemented. Furthermore, the memory 1200 includes a training database (or first database) (130 of FIG. 1 and DB1 of FIGS. 6 and 11 through 14) and an unannotated database (or second database) (DB2 of FIG. 6 and FIGS. 11 through 14).

Figure 16:
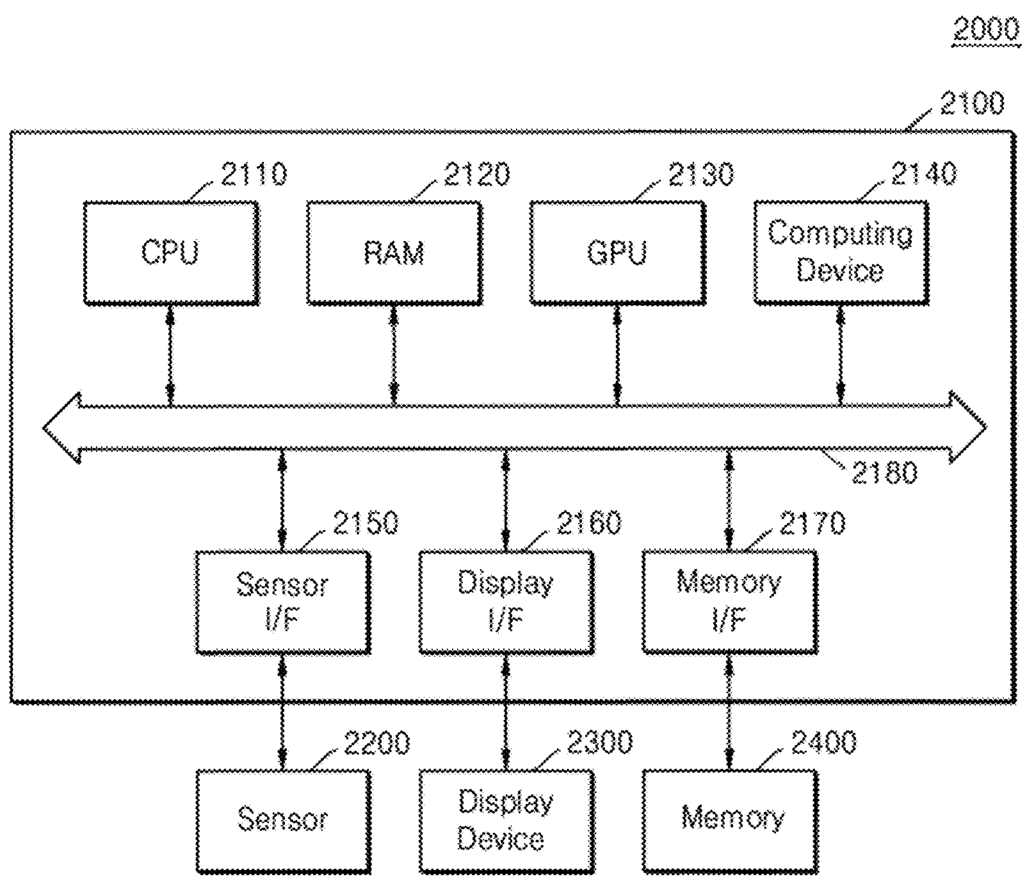
FIG. 16 is a block diagram illustrating an integrated circuit and a device including the integrated circuit, according to an example embodiment of the inventive concept.

FIG. 16 is a block diagram illustrating an integrated circuit 2100 and a device 2000 including the integrated circuit 2100, according to an example embodiment of the inventive concept.

Referring to FIG. 16, the device 2000 may include the integrated circuit 2100 and components connected to the integrated circuit 2100, such as a sensor 2200, a display device 2300, and a memory 2400. The device 2000 may be a device for processing data based on a neural network. For example, the device 2000 may be a data server or a mobile device such as a smartphone, a gaming device, ADAS, a wearable device, etc.

According to an example embodiment of the inventive concept, the integrated circuit 2100 may include a central processing unit (CPU) 2110, RAM 2120, a GPU 2130, a computing device 2140, a sensor interface (I/F) 2150, a display I/F 2160, and a memory I/F 2170. The integrated circuit 2100 may further include other general-purpose components such as a communication module, a DSP, a video module, etc., and the components of the integrated circuit 2100 (the CPU 2110, the RAM 2120, and GPU 2130, the computing device 2140, the sensor I/F 2150, the display I/F 2160, and the memory I/F 2170) may exchange data with one another via a bus 2180. In an embodiment, the integrated circuit 2100 may be an AP. In an embodiment, the integrated circuit 2100 may be implemented as a system on a chip (SoC).

The CPU 2110 may control operations of the integrated circuit 2100. The CPU 2110 may include one processor core or a plurality of processor cores (multiple cores). The CPU 2110 may process or execute programs and/or data stored in the memory 2400. In an embodiment, the CPU 2110 may execute programs stored in the memory 2400 to perform neural network training methods according to embodiments of the inventive concept, such as an expansion of training data and retraining.

The RAM 2120 may temporarily store programs, data, and/or instructions. According to an embodiment, the RAM 2120 may be implemented as DRAM or static RAM (SRAM). The RAM 2120 may temporarily store data, e.g., image data, input or output through the sensor I/F 2150 and the display I/F 2160 or generated by the GPU 2130 or the CPU 2110.

In an embodiment, the integrated circuit 2100 may further include ROM. The ROM may store continuously used programs and/or data. The ROM may be implemented as erasable programmable ROM (EPROM) or electrically erasable PROM (EEPROM).

The GPU 2130 may perform image processing on image data. For example, the GPU 2130 may perform image processing on image data received through the sensor I/F 2150. The image data processed by the GPU 2130 may be stored in the memory 2400 or provided to the display device 2300 via the display I/F 2160.

The computing device 2140 may include an accelerator for performing neural network computations. For example, the computing device 2140 may include an NPU. In an embodiment, the GPU 2130 or the computing device 2140 may perform neural network computations in a neural network training phase or data recognition phase.

The sensor I/F 2150 may receive data (e.g., image data, audio data, etc.) input by the sensor 2200 connected to the integrated circuit 2100.

The display I/F 2160 may output data (e.g., an image) to the display device 2300. The display device 2300 may output image data or video data on a display such as a liquid-crystal display (LCD) or an active matrix organic light-emitting diode (AMOLED) display.

The memory I/F 2170 may interface with data input from the memory 2400 outside the integrated circuit 2100 or data output to the memory 2400. According to an embodiment, the memory 2400 may be implemented as a volatile memory such as DRAM or SRAM or a nonvolatile memory such as resistance RAM (ReRAM,) phase-change RAM (PRAM), or NAND flash. The memory 2400 may also be implemented as a memory card (e.g., a multimedia card (MMC) memory, an embedded MMC (eMMC) memory, a secure digital (SD) memory, and a micro SD memory).

While the inventive concept has been particularly shown and described with reference to embodiments thereof, it will be understood that various changes in form and details may be made therein without departing from the spirit and scope of the following claims.

What is claimed is:

1. A neural network training method comprising:

providing a first training set comprising annotated training data;

training a neural network in a first stage using the first training set;

applying the trained neural network to unannotated data to obtain annotated data and reliability values for labels corresponding to the annotated data;

selecting, as reference data, a piece of the annotated data having a first reliability value for its label that is greater than or equal to a threshold value;

generating a plurality of transformed versions of the reference data by transforming the reference data;

obtaining a reliability value for a corresponding label of each transformed version of the reference data;

identifying two or more transformed versions of the reference data each having a second reliability value that is greater than or equal to a predefined reference value;

selecting, at least two transformed versions of the reference data from the two or more transformed versions of the reference data;

creating a second training set including the first training set and the at least two transformed versions of the reference data; and retraining the neural network in a second stage based on the second training set, wherein the at least two transformed versions of the reference data include a first number of transformed versions at a first reliability range and a second number of transformed versions at a second reliability range, wherein the first number is different from the second number.

2. The neural network training method of claim 1, wherein selecting at least two transformed versions of the reference data comprises selecting an amount of the at least two transformed versions of the reference data having the reliability values within the first reliability range corresponding to a ratio set with respect to an amount of the first training set.

3. The neural network training method of claim 1, wherein selecting at least two transformed versions of the reference data comprises selecting a first amount of the at least two transformed versions of the reference data having the reliability values within the first reliability range and a second amount of the at least two transformed versions of the reference data having the reliability values within the second reliability range from the transformed versions based on a reliability distribution for data in the second training set.

4. The neural network training method of claim 1, further comprising:

measuring a performance of the neural network retrained in the second stage based on the second training set;

determining whether the performance of the neural network is below a threshold level;

adjusting the threshold value in response to determining that the performance of the neural network is below the threshold level; and performing the selection of the reference data, the generating of the plurality of transformed versions of the reference data, and the creating of the second training set from among the annotated data based on the adjusted threshold value.

5. The neural network training method of claim 1, further comprising:

determining whether a condition for finishing training is satisfied;

in response to determining that the condition is satisfied, outputting the neural network retrained in the second stage based on the second training set; and in response to determining that the condition is not satisfied, extracting additional annotation data and additional reliability values.

6. The neural network training method of claim 5, wherein the determining of whether the condition for finishing the training is satisfied comprises, in response to determining that an amount of an expanded training set is greater than or equal to a set amount, determining that the condition is satisfied.

7. The neural network training method of claim 5, wherein the determining of whether the condition for finishing the training is satisfied comprises, in response to determining that a performance of the retrained neural network is greater than or equal to a reference level, determining that the condition is satisfied.

8. A neural network training device comprising:

a memory storing one or more instructions; and at least one processor configured to execute the one or more instructions stored in the memory to:

provide a first training set comprising annotated training data;

train a neural network in a first stage using the first training set;

apply the trained neural network to unannotated data to obtain annotated data and reliability values for labels corresponding to the annotated data;

select, as reference data, a piece of the annotated data having a first reliability value for its label that is greater than or equal to a threshold value;

generate a plurality of transformed versions of the reference data by transforming the reference data;

obtain a reliability value for a corresponding label of each transformed version of the reference data;

select, when two or more transformed versions of the reference data each have a second reliability value that is greater than or equal to a predefined reference value, at least two transformed versions of the reference data from the two or more transformed versions of the reference data;

create a second training set including the first training set and the at least two transformed versions of the reference data; and retrain the neural network in a second stage based on the second training set, wherein the at least two transformed versions of the reference data include a first number of transformed versions at a first reliability range and a second number of transformed versions at a second reliability range, wherein the first number is different from the second number.

9. The neural network training device of claim 8, wherein the at least one processor is further configured to execute the one or more instructions to:

process the reference data using a plurality of methods to generate the plurality of transformed versions of the reference data.

10. The neural network training device of claim 9, wherein the at least one processor is further configured to execute the one or more instructions to select the at least two transformed versions of the reference data to be added to the first training set based on the reliability values such that an amount of the at least two transformed versions of the reference data to be added satisfies a reference amount set for each of a plurality of reliability value ranges that are greater than or equal to the reference value.

11. The neural network training device of claim 8, wherein the at least one processor is further configured to execute the one or more instructions to select an amount of the transformed versions of the reference data to be included in the first training set corresponding to a preset ratio set with respect to an amount of the first training set.

12. The neural network training device of claim 11, wherein the preset ratio is greater than 0 but less than or equal to 1.

13. The neural network training device of claim 11, wherein the at least one processor is further configured to execute the one or more instructions to repeat the application of the trained neural network to the unannotated data, the selecting of the reference data, the generating of the transformed versions of the reference data, the creating of the second training set, and the retraining until the amount of added data to the first training set reaches a set amount or a performance of the trained neural network reaches a set reference level.

14. The neural network training device of claim 8, wherein the at least one processor includes at least one accelerator configured to perform computations of the neural network during inference and the retraining.

15. The neural network training device of claim 8, provided in at least one of an application processor, a data server, and an advanced driver assistance system.

16. A neural network system comprising:

a memory storing one or more instructions; and at least one processor configured to execute the one or more instructions stored in the memory to:

receive a first training set including annotated training data:

train a neural network in a first stage using the first training set;

apply the trained neural network to unannotated data to obtain annotated data and reliability values for labels corresponding to each piece of the annotated data;

select, as reference data, a piece of the annotated data having a first reliability value for its label that satisfies a threshold value;

generate a plurality of transformed versions of the reference data by transforming the reference data and obtaining a reliability value for a corresponding label of each transformed version of the reference data;

select, when two or more transformed versions of the reference data each have a second reliability value that is greater than or equal to a predefined reference value, at least two transformed versions of the reference data from the two or more transformed versions of the reference data, wherein the at least two transformed versions of the reference data comprise a first amount of some of the transformed versions of the reference data having the reliability values within a first reliability range and a second amount of other some of the transformed versions of the reference data having the reliability values within a second reliability range from among the plurality of the transformed versions of the reference data based on a reliability distribution for data in a training set, wherein the first reliability range and the second reliability range are greater than or equal to the predefined reference value, wherein the first amount of the some of the transformed versions of the reference data is different from the second amount of the other some of the transformed versions of the reference data;

create a second training set including the first training set, the first amount of the some of the transformed versions of the reference data and the second amount of the other some of the transformed versions of the reference data;

retrain a neural network in a second stage based on the second training set; and extract recognition information for input data by performing inference on the input data based on the retrained neural network.

* * * * *